United States Patent
Ma et al.

(10) Patent No.: US 9,208,077 B1
(45) Date of Patent: Dec. 8, 2015

(54) FORCED MAP ENTRY FLUSH TO PREVENT RETURN OF OLD DATA

(71) Applicant: LSI Corporation, San Jose, CA (US)

(72) Inventors: Li Zhao Ma, Shanghai (CN); Rong Yuan, Shanghai (CN); Peng Xu, Shanghai (CN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 69 days.

(21) Appl. No.: 14/291,127

(22) Filed: May 30, 2014

(51) Int. Cl.
*G06F 12/02* (2006.01)
*G06F 11/14* (2006.01)
*G06F 11/10* (2006.01)

(52) U.S. Cl.
CPC ........ *G06F 12/0246* (2013.01); *G06F 11/1072* (2013.01); *G06F 11/1402* (2013.01); *G06F 11/1446* (2013.01); *G06F 11/1471* (2013.01); *G06F 2212/7201* (2013.01)

(58) Field of Classification Search
CPC ............ G06F 12/0246; G06F 11/1402; G06F 11/1446; G06F 11/1072; G06F 11/1471; G06F 2212/7201
See application file for complete search history.

(56) References Cited

U.S. PATENT DOCUMENTS

| | | | |
|---|---|---|---|
| 8,484,533 B2 | 7/2013 | Olbrich et al. | |
| 8,539,311 B2 | 9/2013 | Steiner et al. | |
| 2009/0307413 A1* | 12/2009 | Chu | G06F 12/0246 711/103 |
| 2010/0169541 A1* | 7/2010 | Freikorn | G06F 12/0246 711/103 |
| 2014/0075252 A1* | 3/2014 | Luo | G11C 11/5635 714/721 |
| 2014/0082261 A1 | 3/2014 | Cohen et al. | |
| 2015/0098271 A1* | 4/2015 | Lasser | G11C 7/1006 365/185.11 |
| 2015/0143185 A1* | 5/2015 | Motwani | G06F 11/1068 714/718 |
| 2015/0178149 A1* | 6/2015 | Cai | G06F 11/1044 714/766 |
| 2015/0199149 A1* | 7/2015 | Sankaranarayanan | G06F 3/0653 711/102 |

* cited by examiner

*Primary Examiner* — Hiep Nguyen
(74) *Attorney, Agent, or Firm* — Suiter Swantz pc llo (57) ABSTRACT

A data storage device flushes newly written data in response to certain events such that, when the device has acknowledged newly written data, the device cannot return old data of the referenced logical block address to the host in any case. If the data of the logical block address has been corrupted, the device returns an uncorrectable error, not old data. A "force map entry flush" flushes modified map entries to NAND when an upper page is programmed. After a power failure and restoration, a storage device is able to analysis map entries to determine whether there is some host data in the uncorrectable die, then prevent return of old data to a host.

20 Claims, 5 Drawing Sheets

FIG. 1

| | | | | | | |
|---|---|---|---|---|---|---|
| 200 | LBA X | TIMESTAMP N | 202 | PAGE A | 224 |
| 204 | LBA Y | TIMESTAMP N + 1 | 206 | PAGE B | 226 |
| 208 | LBA Z | TIMESTAMP N + 2 | 210 | PAGE C | 228 |
| 200 | LBA X | TIMESTAMP N + 3 | 214 | PAGE D | 230 |
| 204 | LBA Y | TIMESTAMP N + 4 | 218 | PAGE E | 232 |
| 208 | LBA Z | TIMESTAMP N + 5 | 222 | PAGE F | 234 |

FIG. 2

| | | |
|---|---|---|
| 300 | LBA X MAPPED TO PAGE A | TIMESTAMP N | 302 |
| 304 | LBA Y MAPPED TO PAGE B | TIMESTAMP N + 1 | 306 |
| 308 | LBA Z MAPPED TO PAGE C | TIMESTAMP N + 2 | 310 |
| 312 | LBA X MAPPED TO PAGE D | TIMESTAMP N + 3 | 314 |
| 316 | LBA Y MAPPED TO PAGE E | TIMESTAMP N + 4 | 318 |
| 320 | LBA Z MAPPED TO PAGE F | TIMESTAMP N + 5 | 322 |

FORCED MAP ENTRY FLUSH TO PREVENT RETURN OF OLD DATA

BACKGROUND OF THE INVENTION

Multi-level cell NAND memory can store two bits in one cell; one upper bit and one lower bit stored in corresponding pages, each page typically comprising eight kilobytes of data. All lower bits in one page comprise a lower page, and all upper bits in one page comprise an upper page. In multi-level cell NAND memory, when an upper page is corrupted, the lower page is also corrupted. If programming of one cell fails, both lower bits and upper bits cannot be read out. Multi-level cells require that the lower page must be programmed first, and then the correspondent upper page can be programmed. If programming the upper page fails, the corresponding lower page will also be corrupted, and can't be read out.

Some systems utilize memory mapping for relating logical block addresses to multi-level cell pages when new data is written to improve performance by preventing write operations until multiple writes can be written to multi-level cells in a batch process. In those cases, a power failure during a write operation could result in old data being returned after power is restored.

Consequently, it would be advantageous if an apparatus existed that is suitable for preventing old data from being returned after a power failure in an efficient multi-level cell architecture.

SUMMARY OF THE INVENTION

Accordingly, the present invention is directed to a novel method and apparatus for preventing old data from being returned after a power failure in an efficient multi-level cell architecture.

In one embodiment of the present invention, a data storage device flushes newly written data in response to certain events such that, when the device has acknowledged newly written data, the device cannot return old data of the referenced logical block address to the host in any case. If the data of the logical block address has been corrupted, then the device returns an uncorrectable error, not old data.

A "force map entry flush" flushes modified map entries to NAND when an upper page is programmed. After a power failure and restoration, a storage device is able to analysis map entries to determine whether there is some host data in the uncorrectable die, then prevent return of old data to a host.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
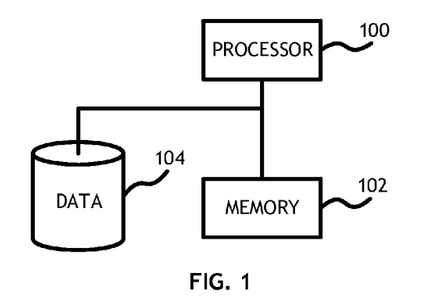
FIG. 1 shows a computer system suitable for implementing embodiments of the present invention.

Referring to FIG. 1, a computer system suitable for implementing embodiments of the present invention is shown. A data storage device according to one embodiment of the present invention comprises a processor 100 configured to execute computer executable program code, a data storage device 104 connected to the processor 100 and memory 102 connected to the processor 100 for storing a memory map. The data storage device 104 comprises a multi-level cell architecture and the memory map associates newly written data, temporarily stored in the memory 102 with a logical block address in the data storage device 104.

Figure 2:
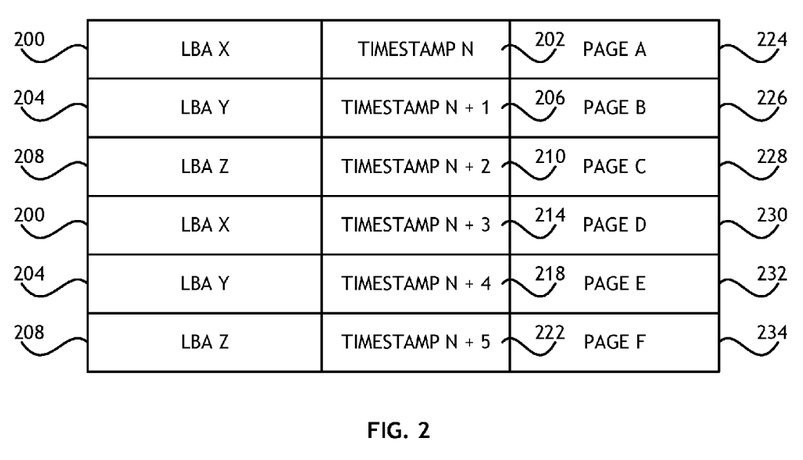
FIG. 2 shows a block diagram representing write operations of logical block addresses to memory device pages.

Referring to FIG. 2, a block diagram representing write operations of logical block addresses to memory device pages is shown. When a multi-level cell device receives a command to write data to a logical block address, the device may determine, in the interest of efficiency, to postpone actually writing the data until multiple write operations can be performed at once.

In one exemplary situation, when a solid-state drive powers on, it first reads a map to determine current host data locations. After such determination, the drive can receive host read/write commands. Consider an example where data corresponding to a first logical block address is written to a first lower page. At a later time, a host writes data to the first logical block address again, and the drive saves the data of the first logical block address to a second lower page. In each case, in a data storage system configured to cache write operations, the data may be cached until the host flushes the cache. The system ensures the first logical block address has been written to the second lower page, and returns an indication of command success. After some time, the host continues to write more data to the drive, and just when the drive attempts to program an upper page corresponding to the second lower page, a power loss causes the upper page program operation to fail and also corrupt the second lower page. When the drive powers on again, an attempt to read the first logical block address will return the first lower page instead of reporting an error status.

In at least one embodiment of the present invention, data is written to a temporary location, possibly in a volatile memory, then a map entry is written that indicates the logical block address 200, 204, 208, of the new data, the intended page 224, 226, 228, 230, 232, 234, and a timestamp 202, 206, 210, 214, 218, 222 corresponding to each write operation. The map allows the device to find the physical location of any stored data.

During each write operation, a map entry is created. A solid-state drive according to at least one embodiment of the present invention receives a write operation and writes the data along with a timestamp 202, 206, 210, 214, 218, 222 to NAND memory. The timestamp 202, 206, 210, 214, 218, 222 is an increasing number indicating the relative time of each write operation. In one example, a first map entry includes a first logical block address 200, a first timestamp 202 and a first intended page 224. In this example, the first intended page 224 is a lower page of a particular multi-level cell. At a later time, a fourth map entry associated with a write operation also references the first logical block address 212, a fourth timestamp 214 and a fourth intended page 230; the fourth intended page 230 being an upper page associated with the first intended page 224. Each timestamp 202, 206, 210, 214, 218, 222 allows the data storage device to correlate data corresponding to the same logical block address 200, 204, 208 to determine the most recent data.

Figure 3:
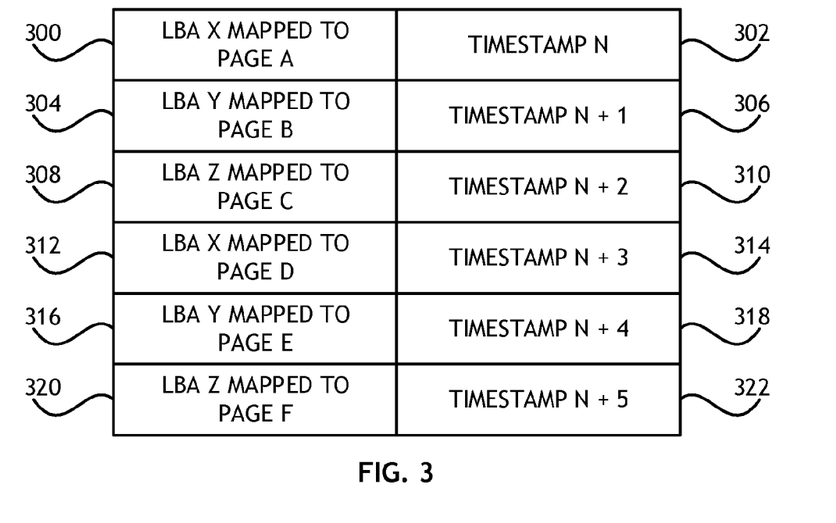
FIG. 3 shows a map of logical block addresses to memory device pages according to at least one embodiment of the present invention.

Referring to FIG. 3, a map of logical block addresses to memory device pages according to at least one embodiment of the present invention is shown. In at least one embodiment, a map includes a plurality of entries, each entry comprising a data location portion 300, 304, 308, 312, 316, 320 and a corresponding timestamp 302, 306, 310, 314, 318, 322. With reference to FIG. 2, when a write operation writes a first logical block 200 to a first intended page 224 at a time corresponding to a first timestamp 202, a corresponding map entry is written to random access memory in the storage device such that a first data location entry 300 specifies a correlation between the first logical block address 200 and the first intended page 224, and a first timestamp 302 that corresponds to the first timestamp 202 of the actual write operation. Likewise, when a write operation writes a second logical block 204 to a second intended page 226 at a time corresponding to a second timestamp 206, a corresponding map entry is written to random access memory in the storage device such that a second data location entry 304 specifies a correlation between the second logical block address 204 and the second intended page 226, and a second timestamp 306 that corresponds to the second timestamp 206 of the actual write operation. Furthermore, when a write operation writes a third logical block 208 to a third intended page 228 at a time corresponding to a third timestamp 210, a corresponding map entry is written to random access memory in the storage device such that a third data location entry 308 specifies a correlation between the third logical block address 208 and the third intended page 228, and a third timestamp 310 that corresponds to the third timestamp 210 of the actual write operation. In each case, the first intended page 224, second intended page 226 and third intended page 228 are lower pages of multi-level cells.

At a later time, a write operation writes the first logical block 200 to a fourth intended page 230 at a time corresponding to a fourth timestamp 214, the fourth intended page 230 being an upper age corresponding to the first intended page 224. A corresponding map entry is written to random access memory in the storage device such that a fourth data location entry 312 specifies a correlation between the first logical block address 200 and the fourth intended page 230, and a fourth timestamp 314 that corresponds to the fourth timestamp 214 of the actual write operation. Likewise, when a write operation writes the second logical block 204 to a fifth intended page 232 at a time corresponding to a fifth timestamp 218, the fifth intended page 232 being an upper page corresponding to the second intended page 226, a corresponding map entry is written to random access memory in the storage device such that a fifth data location entry 316 specifies a correlation between the second logical block address 204 and the fifth intended page 232, and a fifth timestamp 318 that corresponds to the fifth timestamp 218 of the actual write operation. Furthermore, when a write operation writes the third logical block 208 to a sixth intended page 234 at a time corresponding to a sixth timestamp 222, the sixth intended page 234 being an upper page corresponding to the third intended page 228, a corresponding map entry is written to random access memory in the storage device such that a sixth data location entry 320 specifies a correlation between the third logical block address 208 and the sixth intended page 234, and a sixth timestamp 322 that corresponds to the sixth timestamp 222 of the actual write operation.

In some embodiments, map entries are maintained in a volatile memory until enough entries are present for batch writing the map table to a solid-state storage device. In that case, a power failure during a write operation may result in corrupted data. Where the write operation is a write operation directed toward an upper page of a multi-level cell (for example, the fourth, fifth and sixth intended pages 230, 232, 234) both the upper and lower page is corrupted.

In one exemplary situation, supposing that a table comprising the first data location entry 300, the second data location entry 304 and the third data location entry 308 has been written to the NAND data storage device, a subsequent set of write operations produce additional map table entries that are only written to RAM and not to the NAND data storage device. During a write operation corresponding to the sixth data location entry 320, a power loss occurs. In this case, the sixth data location entry 320 associates the third logical block address 208 with the sixth intended page 234, the sixth intended page 234 being an upper page of the third intended page 228. It will be known that, because of the process of writing an upper page, both the third intended page 228 and the sixth intended page 234 will be unreadable. However, because the power loss occurred after the first logical block address 200 was written to the fourth intended page 230 but before the fourth data location entry 312, associating the first logical block address 200 with the fourth intended page 230, was written to the NAND data storage device, the fourth data location entry 312 is lost and the most recent map entry stored in non-volatile memory indicates that the first intended page 224 is the actual location of the first logical block address 200. Such association is outdated and old data will be returned.

Figure 4:
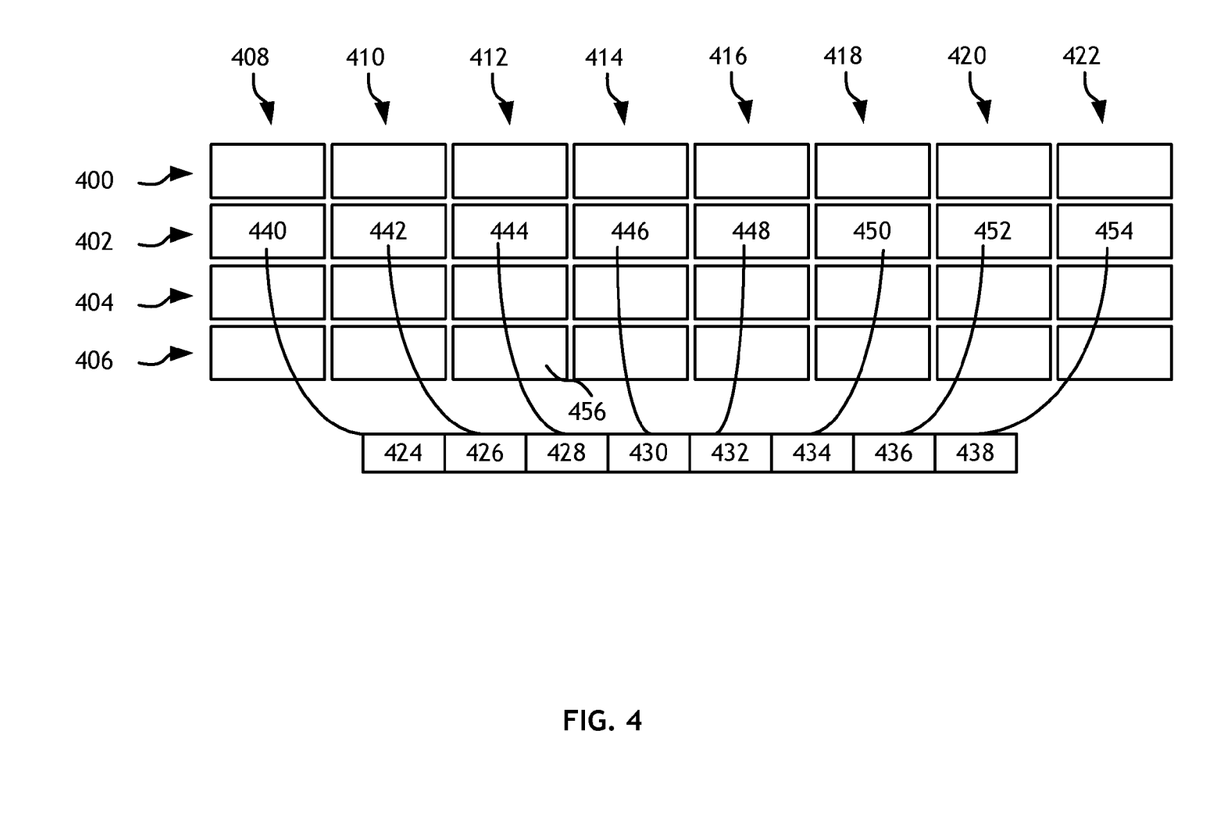
FIG. 4 shows a block diagram of a data storage element and map entries useful in at least one embodiment of the present invention.

Referring to FIG. 4, a block diagram of a data storage element and map entries useful in at least one embodiment of the present invention is shown. In at least one embodiment of the present invention, a multi-level cell data storage element comprises memory pages organized into a first set of lower page 400 and a corresponding first set of upper page 404, and a second set of lower page 402 and a corresponding second set of upper pages 406. Each page in the first set of lower pages 400 is associated with a page in the first set of upper pages 404. Likewise, each page in the second set of lower pages 402 is associated with a page in the second set of upper pages 406. Each set of pages 400, 402, 404, 406 is divided into dies 408, 410, 412, 414, 416, 418, 420, 422.

In one exemplary embodiment, the write sequence for a solid-state drive according to at least one embodiment of the present invention begins with the first set of lower pages 400, starting from the first die 408, then the second die 410, third die 412, fourth die 414, fifth die 416, sixth die 418, seventh die 420 and eighth die 422. Once the last die 422 of the first set of lower pages 400 is written, the solid-state drive then starts writing to the second set of lower pages 402 starting from the first die 408, then the second die 410, third die 412, fourth die 414, fifth die 416, sixth die 418, seventh die 420 and eighth die 422. Once the last die 422 of the second set of lower pages 402 is written, the solid-state drive then starts writing to the first set of upper pages 404 starting from the first die 408, then the second die 410, third die 412, fourth die 414, fifth die 416, sixth die 418, seventh die 420 and eighth die 422. Once the last die 422 of the first set of upper pages 404 is written, the solid-state drive then starts writing to the second set of upper pages 406 starting from the first die 408, then the second die 410, third die 412, fourth die 414, fifth die 416, sixth die 418, seventh die 420 and eighth die 422.

Each time a page is written, a map entry 424, 426, 428, 430, 432, 434, 436, 438 is written to a volatile memory to associate a logical block address with a particular page. For example, a first map entry 424 associates a logical block address with a first page 440 in the second set of lower pages 402, a second map entry 426 associates a logical block address with a second page 442 in the second set of lower pages 402, a third map entry 428 associates a logical block address with a third page 444 in the second set of lower pages 402, a fourth map entry 430 associates a logical block address with a fourth page 446 in the second set of lower pages 402, a fifth map entry 432 associates a logical block address with a fifth page 448 in the second set of lower pages 402, a sixth map entry 434 associates a logical block address with a sixth page 450 in the second set of lower pages 402, a seventh map entry 436 associates a logical block address with a seventh page 452 in the second set of lower pages 402 and an eighth map entry 438 associates a logical block address with an eighth page 454 in the second set of lower pages 402. In at least one embodiment of the present invention, modified map entries are flushed from volatile memory to a location in the NAND data storage device when certain conditions are satisfied. For example, when an upper page (a page in the first set of upper pages 404 or the second set of upper pages 406), the correspondent lower page's map entry must be flushed to the NAND data storage. For example, when a write operation attempts to write data to a third page 456 in the second set of upper pages 406, the third page 456 corresponding to the third page 444 in the second set of lower pages 402, any map entries in volatile memory associated with the third page 444 in the second set of lower pages 402, such as the third map entry 428, will be flushed. In at least one embodiment of the present invention, all map entries 424, 426, 428, 430, 432, 434, 436, 438 in volatile memory associated with the second set of lower pages 402 will be flushed. In at least one embodiment, all map entries in volatile memory, regardless of the corresponding page will be flushed.

In at least one embodiment, before a data storage device with multi-level cells begins to write data to the first set of upper pages 404 all map entries corresponding to the first set of lower pages 400 must be flushed. Likewise, before a data storage device with multi-level cells begins to write data to the second set of upper pages 406 all map entries corresponding to the second set of lower pages 402 must be flushed.

Figure 5:
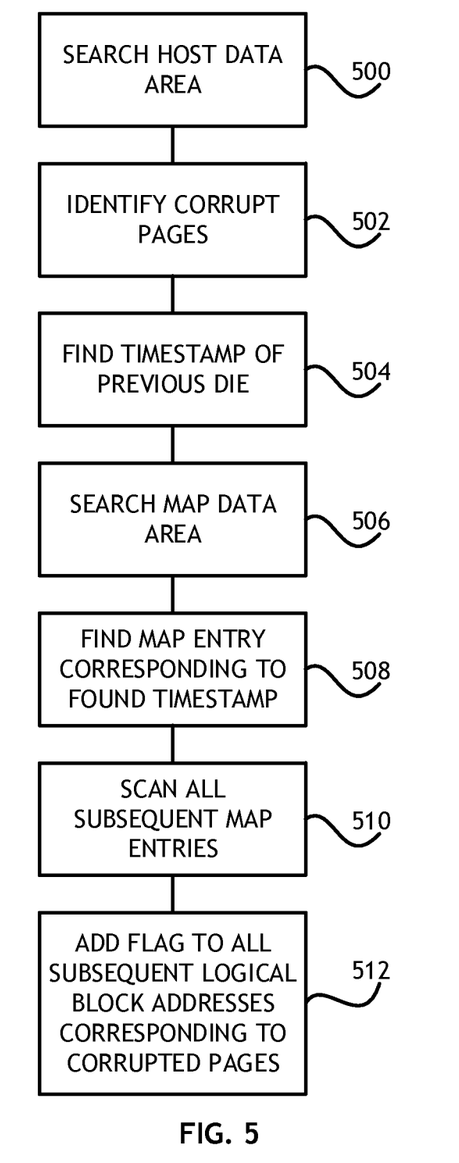
FIG. 5 shows a flowchart of at least one embodiment of the present invention.

Referring to FIG. 5, a flowchart of at least one embodiment of the present invention is shown. After a power loss, a data storage device having multi-level cell NAND memory would restore functionality by searching 500 the host data area and identifying 502 any corrupted pages. Considering the example in FIG. 4, where a power loss occurred during a write operation to the third page 456 in the second set of upper pages 406, the data storage device would identify 502 the third page 456 in the second set of upper pages 406 and the third page 444 in the second set of lower pages 402 as corrupted. Having identified the earliest corrupted page (the third page 444 of the second set of lower pages 402) the data storage device finds 504 the timestamp of the die written immediately before the earliest corrupted page. Using the present example, the die written immediately before the earliest corrupted die would be the second page 442 of the second set of lower pages 402. Once the timestamp of the die is found 504, the data storage device begins to search 506 the map data area to find 508 map entries having substantially the same timestamp as the die written before the earliest corrupted page. The data storage device then scans 510 all subsequent map entries (map entries having a timestamp greater than the timestamp of the die written before the earliest corrupted page). For subsequent map entries corresponding to logical block addresses listed in corrupted pages, a flag is added 512 to the map entry indicating a corrupted logical block address. The flag prevents the erroneous reading of old data.

Figure 6:
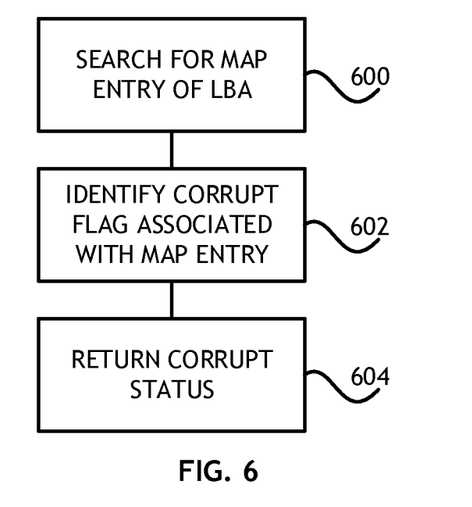
FIG. 6 shows a flowchart of at least one embodiment of the present invention.

Referring to FIG. 6, a flowchart of at least one embodiment of the present invention is shown. After any corrupted logical block addresses are flagger, a data storage device according to at least one embodiment of the present invention again begins to service data requests. Where a host sends a command to read a logical block address that has been flagged, the data storage device searches 600 the map entries for the logical block address, identifies 602 the corrupt logical block address flag and returns 604 a corrupted status.

Solid state drives according to at least one embodiment of the present invention identify corrupted logical block addresses based on timestamps. Timestamps are valid because map entries stored in volatile memory are flushed before a write operation to an upper page would present the possibility of returning old data.

It is believed that the present invention and many of its attendant advantages will be understood by the foregoing description of embodiments of the present invention, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A computer apparatus comprising:
a processor;
memory connected to the processor; and
a data storage device comprising multi-level cell NAND, wherein the processor is configured to:
receive a data write request to write data corresponding to a logical block address to the data storage device;
determine that one or more map entries corresponding to one or more lower pages in the data storage device are currently stored in the memory;
determine that the data will be written to an upper page corresponding to a lower page in the one or more map entries;
flush the one or more map entries to the data storage device;
write the data to one or more pages in the data storage device; and
write a map entry in the memory associating the one or more pages with a logical block address.

2. The computer apparatus of claim 1, wherein each of the one or more map entries comprises a timestamp corresponding to a time when corresponding data was written to the data storage device.

3. The computer apparatus of claim 1, wherein the processor is further configured to:
detect a power loss during a write operation;
identify one or more pages corrupted during the write operation; and
identify a last page written prior to an earliest corrupted page in the one or more pages.

4. The computer apparatus of claim 3, wherein the processor is further configured to:
   determine a last timestamp associated with the last page; and
   scan a data structure comprising map entries to identify one or more map entries having a substantially similar timestamp to the last timestamp.

5. The computer apparatus of claim 4, wherein the processor is further configured to:
   scan the data structure to identify one or more map entries having a timestamp subsequent to the last timestamp, and corresponding to a logical block address associated with at least one of the one or more pages corrupted during the write operation;
   set a flag in the one or more map entries having a timestamp subsequent to the last timestamp, and corresponding to a logical block address associated with at least one of the one or more pages corrupted during the write operation indicating that all map entries associated with the logical block address are corrupted.

6. The computer apparatus of claim 5, wherein the processor is further configured to:
   receive a read request for data in the logical block address;
   search one or more map entries in the data structure to find a map entry associated with the logical block address; and
   return a corrupt status upon identifying the flag.

7. The computer apparatus of claim 1, wherein the processor is further configured to:
   receive a read request for data in a logical block address;
   search one or more map entries in a data structure of map entries associating logical block addresses with pages in the data storage device to find a map entry associated with the logical block address;
   identify a flag indicating that any map entries associated with the logical block address are corrupted; and
   return a corrupt status upon identifying the flag.

8. A method comprising:
   receiving a data write request to write data corresponding to a logical block address to the data storage device;
   determining that one or more map entries corresponding to one or more lower pages in the data storage device are currently stored in the memory;
   determining that the data will be written to an upper page corresponding to a lower page in the one or more map entries;
   flushing the one or more map entries to the data storage device;
   writing the data to one or more pages in the data storage device; and
   writing a map entry in the memory associating the one or more pages with a logical block address.

9. The method of claim 8, wherein each of the one or more map entries comprises a timestamp corresponding to a time when corresponding data was written to the data storage device.

10. The method of claim 8, further comprising:
    detecting a power loss during a write operation;
    identifying one or more pages corrupted during the write operation; and
    identifying a last page written prior to an earliest corrupted page in the one or more pages.

11. The method of claim 10, further comprising:
    determining a last timestamp associated with the last page; and
    scanning a data structure comprising map entries to identify one or more map entries having a substantially similar timestamp to the last timestamp.

12. The method of claim 11, further comprising:
    scanning the data structure to identify one or more map entries having a timestamp subsequent to the last timestamp, and corresponding to a logical block address associated with at least one of the one or more pages corrupted during the write operation;
    setting a flag in the one or more map entries having a timestamp subsequent to the last timestamp, and corresponding to a logical block address associated with at least one of the one or more pages corrupted during the write operation indicating that all map entries associated with the logical block address are corrupted.

13. The method of claim 12, further comprising:
    receiving a read request for data in the logical block address;
    searching one or more map entries in the data structure to find a map entry associated with the logical block address; and
    returning a corrupt status upon identifying the flag.

14. A multi-level cell data storage system comprising:
    a processor;
    memory connected to the processor; and
    computer executable program code,
    wherein the computer executable program code configures the processor to:
      receive a data write request to write data corresponding to a logical block address to the data storage device;
      determine that one or more map entries corresponding to one or more lower pages in the data storage device are currently stored in the memory;
      determine that the data will be written to an upper page corresponding to a lower page in the one or more map entries;
      flush the one or more map entries to the data storage device;
      write the data to one or more pages in the data storage device; and
      write a map entry in the memory associating the one or more pages with a logical block address.

15. The multi-level cell data storage system of claim 14, wherein each of the one or more map entries comprises a timestamp corresponding to a time when corresponding data was written to the data storage device.

16. The multi-level cell data storage system of claim 14, wherein the processor is further configured to:
    detect a power loss during a write operation;
    identify one or more pages corrupted during the write operation; and
    identify a last page written prior to an earliest corrupted page in the one or more pages.

17. The multi-level cell data storage system of claim 16, wherein the processor is further configured to:
    determine a last timestamp associated with the last page; and
    scan a data structure comprising map entries to identify one or more map entries having a substantially similar timestamp to the last timestamp.

18. The multi-level cell data storage system of claim 17, wherein the processor is further configured to:
    scan the data structure to identify one or more map entries having a timestamp subsequent to the last timestamp, and corresponding to a logical block address associated with at least one of the one or more pages corrupted during the write operation;

set a flag in the one or more map entries having a timestamp subsequent to the last timestamp, and corresponding to a logical block address associated with at least one of the one or more pages corrupted during the write operation indicating that all map entries associated with the logical block address are corrupted.

19. The multi-level cell data storage system of claim 18, wherein the processor is further configured to:
receive a read request for data in the logical block address;
search one or more map entries in the data structure to find a map entry associated with the logical block address; and
return a corrupt status upon identifying the flag.

20. The multi-level cell data storage system of claim 14, wherein the processor is further configured to:
receive a read request for data in a logical block address;
search one or more map entries in a data structure of map entries associating logical block addresses with pages in the data storage device to find a map entry associated with the logical block address;
identify a flag indicating that any map entries associated with the logical block address are corrupted; and
return a corrupt status upon identifying the flag.

* * * * *